United States Patent [19]

Kierum et al.

[11] Patent Number: 4,953,763
[45] Date of Patent: Sep. 4, 1990

[54] ANIMAL SCENT DISPENSING APPARATUS

[76] Inventors: Chandler T. Kierum, 124 Jeansonne St., Pineville, La. 71360; Leonard J. Dupree, 2007 Dixie St., Alexandria, La. 71309

[21] Appl. No.: 267,537
[22] Filed: Nov. 4, 1988
[51] Int. Cl.⁵ .............................. G04C 5/08
[52] U.S. Cl. .................... 222/644; 222/422; 222/481.5; 43/1; 239/70; 119/72.5
[58] Field of Search .......... 222/422, 481.5, 644, 222/175, 638; 239/43, 70; 43/1; 119/29, 51.11, 72, 72.5; 604/246

[56] References Cited

U.S. PATENT DOCUMENTS

| | | | |
|---|---|---|---|
| 2,605,938 | 8/1952 | Balcar | 222/422 |
| 3,498,228 | 3/1970 | Blumle et al. | 222/644 |
| 3,598,288 | 8/1971 | Posgate | 222/644 |
| 4,315,599 | 2/1982 | Biancardi | 239/43 X |
| 4,506,806 | 3/1985 | Lincoln et al. | 222/175 |
| 4,667,430 | 5/1987 | Ziese, Jr. | 43/1 |
| 4,682,715 | 7/1987 | Reeves | 222/175 |
| 4,773,177 | 9/1988 | Gray, II et al. | 43/1 |

Primary Examiner—Kevin P. Shaver
Assistant Examiner—Gregory L. Huson
Attorney, Agent, or Firm—Pravel, Gambrell, Hewitt, Kimball & Krieger

[57] ABSTRACT

An animal scent dispensing apparatus includes a housing that can be supported in an elevated position above the ground. A reservoir is supported by the housing for containing an animal scent to be dispensed. An outlet releases fluid scent from the reservoir in a drip-like fashion so that it can be dispensed to fall to the ground. A valved vacuum line operable between open and closed flow positions and communicates with the reservoir for maintaining a vacuum on the reservoir when not dispensing fluid therefrom. A timed valving mechanism fence the reservoir at the vacuum line so that fluid in the reservoir will dispense from the outlet and the outlet defines at least in part the dispensing flow rate as a fluid dispensed from the reservoir. The apparatus has particular utility for deer hunting wherein a scent can be dispensed at multiple times during the day for very short time periods of for example a few seconds.

8 Claims, 1 Drawing Sheet

U.S. Patent
Sep. 4, 1990
4,953,763
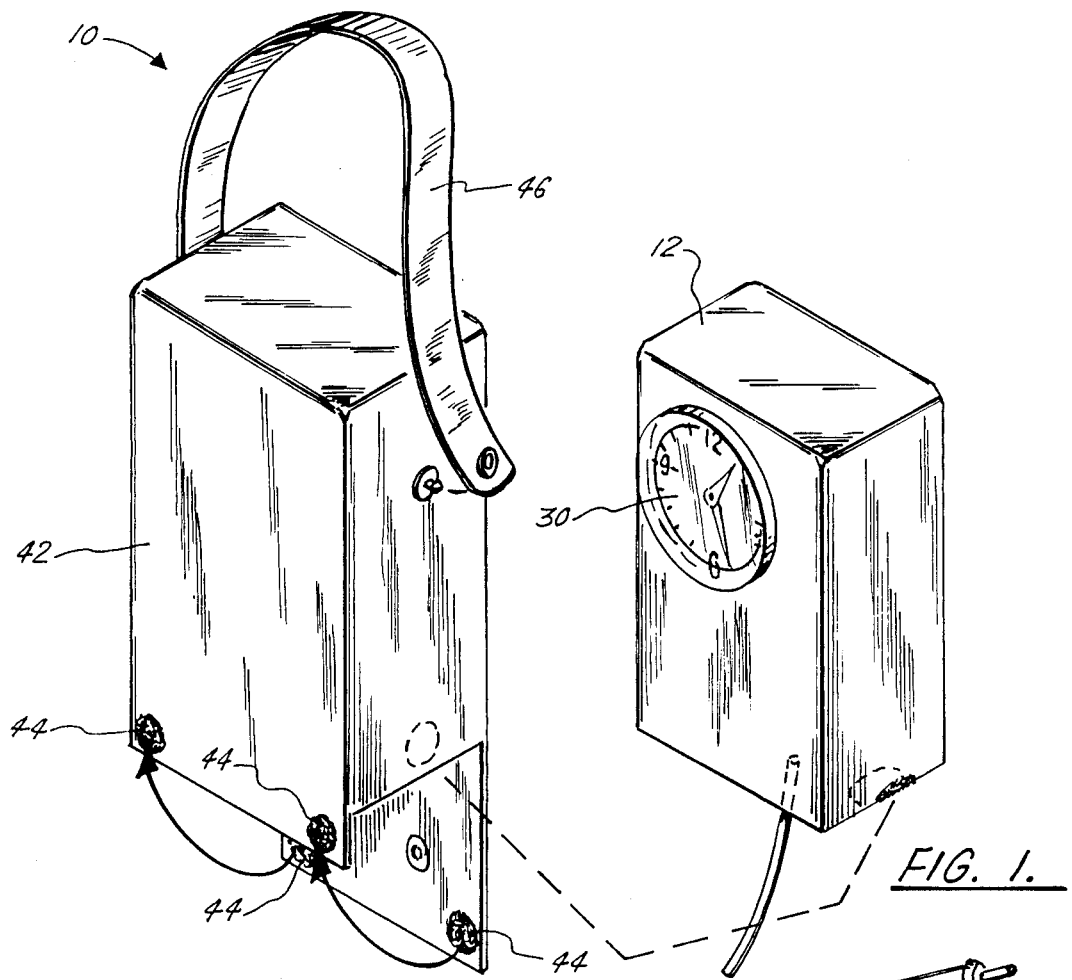
FIG. 1.
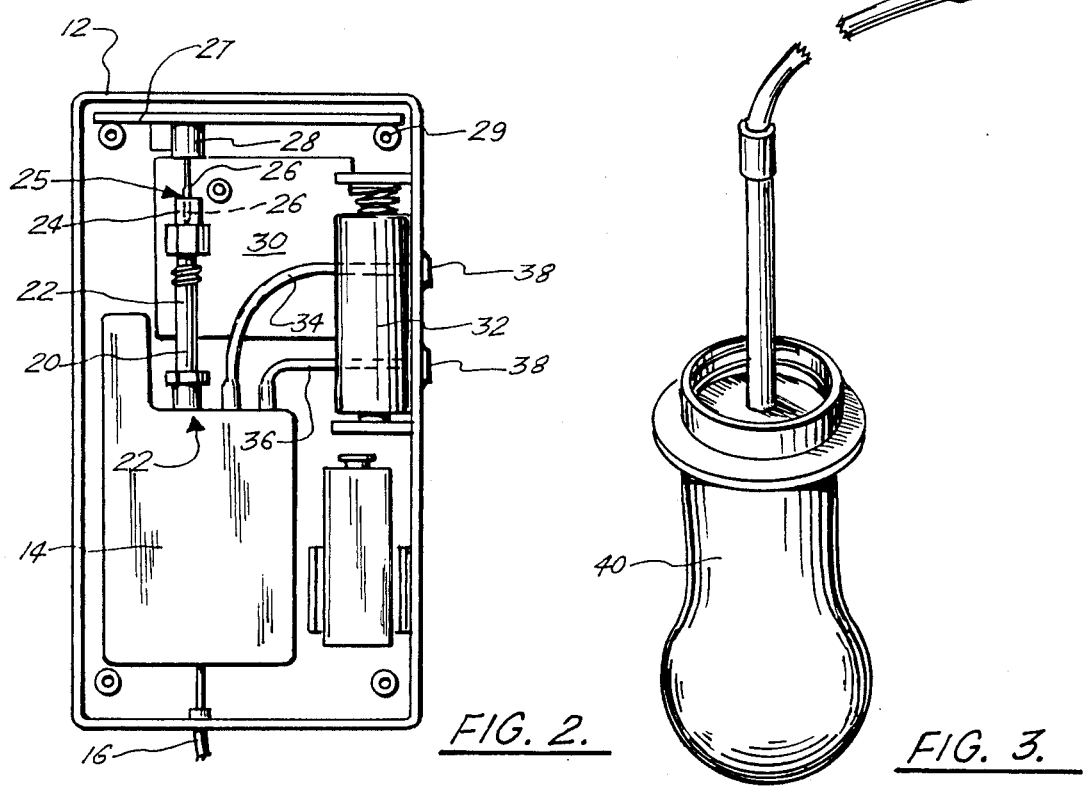
FIG. 2.
FIG. 3.

ANIMAL SCENT DISPENSING APPARATUS

BACKGROUND OF THE INVENTION

The present invention relates to an improved device for dispensing animal scent, such as the type of scent used by deer hunters for example. The present invention more particularly relates to an improved animal scent dispensing apparatus which can be supported above the ground at a remote location so that animal scent can be dispensed as a drip and dropped to the ground intermittently at designated intervals.

Hunters attempt to lure animals, such as for example white tail deer, to a specific area by placing a small amount of animal scent on the ground. Concentrated animal scents, such as doe scent, are commonly used and commercially available in small bottles. Some hunters use an intravenous (I.V.) bag or bottle available at most sporting goods stores to contain the scent. The I.V. bag is hung from a tree and the scent is dispensed through a regulated drip tube drop by drop. Typically, the drip is regulated to continuously dispense one ounce of scent over a period of fifteen (15) to twenty-four (24) hours. The commercially available I.V. bag and regulated drip tube dispense drops continuously. This continuous dispensing of the scent is unlike the natural method of presentation of scent by animals, typically once or twice a day.

During mating season, a white tail buck makes a "scrape" by pawing the ground. The scrape is the buck's method of notifying does that he will return to the spot in search of a mate. A doe visiting the spot will sprinkle it with a small amount of urine to notify the buck of her interest. The buck and the doe return to the area until they meet. Deer typically move during the early morning and early evening hours. The doe typically dispenses the scent twice a day and during those time periods. It is thus not necessary for hunters to dispense scent continuously during the day. A scent dispensing apparatus that can be timed to dispense scent during the hours the deer normally move would not only conserve scent, but also obviate the frequent introduction of human scents into the area when the device is refilled.

With some prior art scent dispensing devices, the scent is dispersed into the atmosphere, rather than dropping to the ground. These prior art devices are not effective since they do not stimulate the natural method of scent presentation used by the deer, i.e., dripping the scent onto the ground.

Some prior art dispensing devices require access to an electrical utilities power supply and are therefore not suited for animal scent dispensed at a remote location.

Some prior art dispensing devices are noisy in operation. These devices are not suited dispense scents to attract animals since the noise would frighten the animals. Hunters also often used "feeders" which dispense corn, grain, or commercial feed. These "feeders" employ a canister and a spinning wheel. The wheel interfaces with a dispensing opening in the canister. Corn or grain jams the opening when the wheel is not spinning. When the wheel spins, corn is spun away from the opening and falls to the ground. The wheel is operated intermittently using a timer.

Various prior art devices for dispensing products, as well as the apparatus and the method of this construction in general are found to be exemplary of the following U.S. patents:

| U.S. Pat. No. | Inventor |
| --- | --- |
| 3,279,653 | Pfleger |
| 3,589,563 | Carragan |
| 4,268,285 | Mason |
| 4,315,599 | Biancardi |
| 4,415,797 | Choustoulakis |
| 4,523,717 | Schwab |
| 4,609,127 | Hart |
| 4,679,943 | Kavoussi et al |

U.S. Pat. No. 3,279,653 to Pfleger discloses a portable dispensing apparatus for the injection of medicines or chemicals into humans, plants and animals at a very low dispensing rate. The device is powered by a spring wound motor that must be rewound at relatively frequent intervals. The timing mechanism does not allow the dispensing intervals to be set for a specific time.

U.S. Pat. No. 3,589,563 to Carragan is an automatic battery powered aerosol dispenser. The device allows for discharge of a product into the air.

U.S. Pat. No. 4,268,285 to Mason discloses an air freshening apparatus which uses a fan to disperse liquid or gel at controlled intervals. The device is designed to both filter and treat circulating room air.

U.S. Pat. No. 4,315,599 to Biancardi discloses a method and apparatus for automatically watering vegetation at controlled intervals by condensing water humidity in the atmosphere. The condensed water vapor drips directly onto the soil surrounding the vegetation. The apparatus uses an electrical utility power supply.

U.S. Pat. No. 4,415,797 to Choustoulakis discloses an apparatus for dispensing materials such as insecticide, deodorant and disinfectant contained in a pressurized can into the atmosphere. The materials are released from the can by energizing a solonoid automatically at selectable time intervals for preset durations. The device is powered by electricity.

U.S. Pat. No. 4,523,717 to Schwab is an animal trail marker and scent container which dispenses scent continuously into the atmosphere.

U.S. Pat. No. 4,609,127 to Hart discloses a timed dispenser for fluid additives for use in fluid systems such as water and sewerage systems The device has a housing which supports and contains a reservoir, batteries, timing relays, other electrical components and a pump and a valve. The pump circulates the additive within the reservoir from a point at the bottom of the reservoir to an open port for dispensing into a discharge line.

U.S. Pat. No. 4,679,943 to Kavoussi discloses a scent clock by metallic device for releasing scents into the atmosphere. Heat sensitive fragrances are released when a heating element is energized. The device is designed to be virtually noiseless in operation.

GENERAL DISCUSSION OF THE PRESENT INVENTION

The present invention provides an improved animal scent dispensing apparatus which includes a housing, a scent tank reservoir supported by the housing, a drip tube dispensing outlet which dispenses fluid from the bottom of the scent tank, and a needle valve central mechanism which allows air to enter the top of the scent tank so that gravity will move the fluid through the scent tank reservoir into the drip tube outlet and onto the ground. The time and duration of the dispensing operation having been predetermined. The needle valve is controlled by means of a clock which can be set to activate the needle valve at desired time intervals. The clock is battery powered for use in areas remote from an electrical utility power supply.

The housing of the animal scent dispensing apparatus can be encased in an insulated, water repellant camouflage pouch so that the apparatus is virtually weatherproof and able to operate in extremely cold, wet weather.

The animal scent dispensing apparatus would be used by for example deer hunters. A very small amount of animal scent such as doe scent could be dispensed in the early morning hours and in the evening hours. A deer hunter typically would use the device to dispense doe scent for a very short time period only a couple of times a day when the deer are not present. This is typically done since a buck will return to an area which is scented only a couple of times a day and only at certain times a day, typically in the early morning and in the evening.

An object of the present invention is to provide a device for dispensing animal scents which regulates the time and duration of each dispensing operation.

Another object of the present invention is to provide a device which can be set for dispersal of scent at specific times of the day and night in order to simulate the travel and mating characteristics of deer.

Another object of the present invention is to provide a device for dispensing animal scents which can be supported in an elevated position above ground so that the scent can drop to the ground in the natural method of presentation of scents between a doe and a buck.

Yet another object of the present invention is to provide a device for dispensing animal scents having a reservoir of sufficient capacity so as to contain animal scents in commercially available portions and to dispense the animal scent over a period of months.

Yet another object of the present invention is to provide a device for dispensing animal scents which uses battery power for such short periods each day and only to valve an air vent to the tank so that the battery will have a life extending over a period of months.

Yet another object of the present invention is to provide a device for dispensing an animal scent which can be used in areas remote from an electrical utilities power supply.

Yet another object of the present invention is to provide a device for dispensing animal scents that is easy and inexpensive to operate, maintain and repair.

Yet another object of the present invention is to provide a device for dispensing a non-altered, chemically natural scent which is obtained directly from the body fluids of the animal sought to be attracted.

Yet another object of the present invention is to provide a device for dispensing animal scents which can be concealed and operates silently so as not to frighten the animals in the area.

Yet another object of the present invention is to provide a device which will operate without the intervention of a hunter over a period of months so that the human scent will dissipate and not alert the animal of its presence.

Yet another object of the present invention is to provide a device which can operate in extremely cold, wet weather.

Yet another object of the present invention is to provide an automatic animal scent dispensing apparatus.

BRIEF DESCRIPTION OF THE DRAWINGS

A better understanding of the invention can be had when the detailed description of a preferred embodiment set forth below is considered in conjunction with the drawings, in which:

FIG. 1 is a perspective view of the animal scent dispensing apparatus of the present invention and its carrying case;

FIG. 2 is a plan view of the animal scent dispensing apparatus of the present invention with the cover removed;

FIG. 3 is a perspective side view of the squeeze bulb syringe which is used to fill the animal scent tank reservoir of the preferred embodiment of the present invention.

DETAILED DESCRIPTION OF THE PREFERRED EMBODIMENT

The present invention provides an improved animal scent dispensing apparatus designated generally by the numeral 10 in the drawings. FIG. 2 shows apparatus 10 which includes a housing 12 which supports scent tank reservoir 14. Reservoir 14 contains a fluid an animal scent (not shown) to be dispersed. Outlet 16 releases fluid animal scent from the reservoir 14 in a drip like fashion through drip tube 18 so that the fluid animal scent can be dispensed to fall to the ground.

Valved air line 20 is operable between open and closed flow positions and communicates with reservoir 14. The air line 20 is normally closed for maintaining a vacuum on reservoir 14 when not dispensing animal scent fluid therefrom. Valved air line 20 includes an inner bore 22 extending between the upper portion of reservoir 14 to the top of conduit 20 at valving member 24. Valving member 24 has a valve seat 25 and includes needle valve 26 movably mounted to pivot with arm 27 about pivot 29 and between open and closed positions. The valve seat 25 can be an inner portion of bore 22 correspondingly shaped to receive needle valve 26 so that needle valve 26 seats upon and forms a closure with seat 25. Electromagnet 28 activates arm 27 to pivot so that needle valve 26 can be opened. Stop 31 and pivot support 29 normally hold arm 27 in a closed position as seen in FIG. 2. When the arm 27 is in this resting closed position, needle valve 26 forms a closure to line 20 by closing upon valve seat 25.

FIG. 1 shows timer 30 for regulating the time and duration of each dispensing operation. Timer 30 is powered by battery 32.

Fill tube 34 allows animal scent to be injected into scent tank reservoir 14 by means of squeeze bulb syringe 40. As the animal scent is being injected into scent tank reservoir 14, it displaces air in the scent tank reservoir 14 which escapes through vent tube 36.

Once scent tank reservoir 14 is filled, plugs 38 are inserted into fill tube 34 and vent tube 36 in order to create a vacuum.

FIG. 1 shows carrying case 42 which encases housing 12 and is held in place by fasteners 44. Animal scent dispensing apparatus 10 can be supported in an elevated position above the ground such as for example on a tree limb by strap 46.

In view of the numerous modifications which could be made to the preferred embodiment disclosed herein without departing from the scope or spirit of the present invention, the details herein are to be interpreted as illustrative and not in a limiting sense.

What is claimed as the invention is:

1. An animal scent dispensing apparatus comprising:
   (a) a housing that can be supported in an elevated position above the ground;
   (b) animal lure dispensing reservoir means contained by the housing for containing a liquid animal scent to be dispensed from the reservoir in small amounts at intervals and over several days;
   (c) outlet means for releasing a small volume of fluid scent from the reservoir at pre-selected time intervals as determined by a timer within said housing, each in a drip-like fashion so that the dispensed fluid scent will ball to the ground;
   (d) valved air line means communicating with the reservoir means, for maintaining a vacuum on the reservoir means when not dispensing fluid therefrom;
   (e) timed valving means within the housing responsive to said timer and operable between open and closed flow positions for venting the reservoir means at the valved air line means to thereby valve flow from the reservoir means via the outlet means; and
   (f) power supply means within the housing for powering the timed valving means.

2. The apparatus of claim 1 wherein the outlet means comprises an opening in the bottom portion of the reservoir means.

3. The apparatus of claim 1 further wherein said timer is for regulating the appropriate time and duration of each dispensing operation.

4. The apparatus of claim 1 wherein the outlet means is an elongated drip tube extending downwardly from the bottom of the reservoir and being of sufficiently small diameter that the reservoir does not dispense fluid via the outlet drip tube when the valve means is at the closed flow position.

5. The apparatus of claim 1 wherein the timed valving means comprising in part a valve and electromagnetic means for activating the valve.

6. The apparatus of claim 5 wherein the valve includes a conduit extending from the upper portion of the reservoir means, and a valving member movably mounted with respect to and upon the housing between a closed position that seals the conduit and an open position that vents the conduit and the reservoir means.

7. The apparatus of claim 6 wherein the valving member comprises a needle valve movably mounted to valve the conduit.

8. The apparatus of claim 6 wherein the valve comprises an electromagnet and a valving member movable between open flow and closed flow positions responsive to operation of the electromagnet between respective "on" and "off" positions.

* * * * *